US012271085B2

(12) United States Patent
Lu et al.

(10) Patent No.: US 12,271,085 B2
(45) Date of Patent: Apr. 8, 2025

(54) ARRAY SUBSTRATE AND DISPLAY PANEL

(71) Applicant: TCL CHINA STAR OPTOELECTRONICS TECHNOLOGY CO., LTD., Guangdong (CN)

(72) Inventors: Kang Lu, Guangdong (CN); Yani Chen, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 5 days.

(21) Appl. No.: 18/331,947

(22) Filed: Jun. 9, 2023

(65) Prior Publication Data
US 2024/0264498 A1 Aug. 8, 2024

(30) Foreign Application Priority Data

Feb. 6, 2023 (CN) .......................... 202310144045.5

(51) Int. Cl.
G02F 1/1362 (2006.01)
(52) U.S. Cl.
CPC .. *G02F 1/136209* (2013.01); *G02F 1/136286* (2013.01)

(58) Field of Classification Search
None
See application file for complete search history.

(56) References Cited

U.S. PATENT DOCUMENTS

| 2014/0176399 | A1* | 6/2014 | Lee | G09G 3/20 345/55 |
| 2019/0179185 | A1* | 6/2019 | Oh | G02F 1/133514 |
| 2019/0204689 | A1* | 7/2019 | Li | G02F 1/1368 |

* cited by examiner

Primary Examiner — Shan Liu
(74) Attorney, Agent, or Firm — PV IP PC; Wei Te Chung

(57) ABSTRACT

The present application discloses an array substrate and a display panel. The array substrate includes a base substrate, a plurality of pixel electrodes, a first and a second shielding lines. The plurality of pixel electrodes are disposed on the base substrate and include a plurality of first pixel electrodes. The plurality of the first pixel electrodes are arranged in a first and a second directions. The first pixel electrode includes a first trunk electrode and a first branch electrode, the first trunk electrode includes a first vertical trunk extending in the first direction. The first shielding line is disposed on the base substrate, and includes a portion disposed on the periphery of the first vertical trunk. The second shielding line is disposed on the base substrate, and includes a portion disposed on the periphery of the first branch electrode. The first and the second shielding lines are electrically insulated.

20 Claims, 5 Drawing Sheets

ARRAY SUBSTRATE AND DISPLAY PANEL

CROSS-REFERENCE TO RELATED APPLICATIONS

This application claims the benefit of Chinese patent application Ser. No. 202310144045.5, filed on Feb. 6, 2023, which is hereby incorporated by reference in its entirety.

TECHNICAL FIELD

The present application relates to the field of display technology, particularly to an array substrate and a display panel.

BACKGROUND

The conventional approaches use 2-domain pixels instead of the original 4-domain pixels to increase the aperture ratio and to improve the transmittance of display panels in vertical alignment (VA) mode.

A DBS (Dataline BM Less) electrode is a metal layer disposed above the data lines and configured to shield the electric field generated between the data lines and pixel electrodes to prevent light leakage caused by liquid crystal shifting near the data lines. Currently, serious dark lines appear when aligning is performed in the 2-domain pixels, resulting in a limited increase or even a decrease in the transmittance of the array substrate compared to 4-domain pixels, therefore the transmittance cannot reach the same level as the increased aperture ratio.

SUMMARY OF THE INVENTION

Embodiments of the present application provide an array substrate and a display panel for improving the transmittance of the display panel.

The embodiments of the present application provide an array substrate comprising: a base substrate; a plurality of pixel electrodes disposed on the base substrate, the plurality of the pixel electrodes comprise a plurality of first pixel electrodes being arranged in a first direction and a second direction, the first pixel electrode comprises a first trunk electrode and a first branch electrode, the first trunk electrode comprises a first vertical trunk extending in the first direction, the first direction and the second direction intersect; a first shielding line disposed on the base substrate, the first shielding line comprises a portion disposed on the periphery of the first vertical trunk; and a second shielding line disposed on the base substrate, the second shielding line comprises a portion disposed on the periphery of the first branch electrode; wherein the first shielding line and the second shielding line being electrically insulated.

Optionally, in some embodiments of the present application, the plurality of the pixel electrodes further comprise a plurality of second pixel electrodes, a plurality of the first pixel electrodes and a plurality of the second pixel electrodes being arranged alternately in the first direction and the second direction, the second pixel electrode comprises a second trunk electrode and a second branch electrode, the second trunk electrode comprises a second vertical trunk extending in the first direction, the first pixel electrode and the second pixel electrode adjacent to each other in the first direction being arranged in a center-symmetric configuration and the first pixel electrode and the second pixel electrode adjacent to each other in the second direction being arranged in an axis-symmetric configuration; wherein the first shielding line comprises a portion disposed on the periphery of the second vertical trunk, and the second shielding line comprises a portion disposed on the periphery of the second branch electrode.

Optionally, in some embodiments of the present application, the first trunk electrode further comprises a first horizontal trunk extending in the second direction, the first branch electrode comprises a first branch portion and a second branch portion connected to the first vertical trunk and the first horizontal trunk; wherein an angle formed by the first branch portion with the first vertical trunk or the first horizontal trunk is different from an angle formed by the second branch portion with the first vertical trunk or the first horizontal trunk; wherein the second trunk electrode further comprises a second horizontal trunk extending in the second direction, the second branch electrode comprises a third branch portion and a fourth branch portion connected to the second vertical trunk and the second horizontal trunk; wherein an angle formed by the third branch portion with the second vertical trunk or the second horizontal trunk is different from an angle formed by the fourth branch portion with the second vertical trunk or the second horizontal trunk.

Optionally, in some embodiments of the present application, the first shielding line comprises a first main body portion and at least one first shielding portion, the first main body portion being disposed on a side of the pixel electrodes, an end of the first shielding portion being connected to the first main body portion, the other end of the first shielding portion extending to a location between the first pixel electrode and the second pixel electrode; wherein the first shielding portion comprises a plurality of first shielding sub-portions and a plurality of second shielding sub-portions being arranged alternately in the first direction, the first shielding sub-portion extending in the first direction, the second shielding sub-portion being connected to the first shielding sub-portion, the first shielding sub-portion being disposed on a side of the first vertical trunk away from the first branch electrode and/or on a side of the second vertical trunk away from the second branch electrode.

Optionally, in some embodiments of the present application, the second shielding line comprises a second main body portion and at least one second shielding portion, the second main body portion being disposed on a side of the pixel electrodes away from the first main body portion, an end of the second shielding portion being connected to the second main body portion, the other end of the second shielding portion extending to a location between the first pixel electrode and the second pixel electrode; wherein the second shielding portion comprises a plurality of third shielding sub-portions and a plurality of fourth shielding sub-portions being arranged alternately in the first direction, the third shielding sub-portion extending in the first direction, the fourth shielding sub-portion being connected to the third shielding sub-portion, the third shielding sub-portion being disposed on a side of the first branch electrode away from the first vertical trunk and/or on a side of the second branch electrode away from the second vertical trunk.

Optionally, in some embodiments of the present application, the array substrate further comprises a plurality of first metal layers, the first metal layers being disposed on the base substrate, the other end of the first shielding portion and the other end of the second shielding portion being connected to the corresponding first metal layers respectively.

Optionally, in some embodiments of the present application, the array substrate further comprises: a plurality of data lines disposed on the base substrate, a plurality of the data lines extending in the first direction; a plurality of scanning lines disposed on the base substrate, a plurality of the scanning lines extending in the second direction, the data lines and scanning lines intersect to define a plurality of sub-pixel units, the sub-pixel unit comprises one of the first pixel electrodes or one of the second pixel electrodes.

Optionally, in some embodiments of the present application, the first shielding sub-portion and the third shielding sub-portion overlap with the data lines, and the second shielding sub-portion and the fourth shielding sub-portion overlap with the scanning lines.

Optionally, in some embodiments of the present application, the pixel electrodes and the first shielding line and the second shielding line are disposed on the same layer.

The embodiments of the present application provide a display panel comprising: an array substrate; an opposing substrate; and a liquid crystal layer; wherein the array substrate and the opposing substrate being disposed opposite to each other, the liquid crystal layer being disposed between the array substrate and the opposing substrate; wherein the array substrate comprises: a base substrate; a plurality of pixel electrodes disposed on the base substrate, the plurality of the pixel electrodes comprise a plurality of first pixel electrodes being arranged in a first direction and a second direction, the first pixel electrode comprises a first trunk electrode and a first branch electrode, the first trunk electrode comprises a first vertical trunk extending in the first direction, the first direction and the second direction intersect; a first shielding line disposed on the base substrate, the first shielding line comprises a portion disposed on the periphery of the first vertical trunk; and a second shielding line disposed on the base substrate, the second shielding line comprises a portion disposed on the periphery of the first branch electrode; wherein the first shielding line and the second shielding line being electrically insulated.

Optionally, in some embodiments of the present application, the plurality of the pixel electrodes further comprise a plurality of second pixel electrodes, a plurality of the first pixel electrodes and a plurality of the second pixel electrodes being arranged alternately in the first direction and the second direction, the second pixel electrode comprises a second trunk electrode and a second branch electrode, the second trunk electrode comprises a second vertical trunk extending in the first direction, the first pixel electrode and the second pixel electrode adjacent to each other in the first direction being arranged in a center-symmetric configuration and the first pixel electrode and the second pixel electrode adjacent to each other in the second direction being arranged in an axis-symmetric configuration; wherein the first shielding line comprises a portion disposed on the periphery of the second vertical trunk, and the second shielding line comprises a portion disposed on the periphery of the second branch electrode.

Optionally, in some embodiments of the present application, the first trunk electrode further comprises a first horizontal trunk extending in the second direction, the first branch electrode comprises a first branch portion and a second branch portion connected to the first vertical trunk and the first horizontal trunk; wherein an angle formed by the first branch portion with the first vertical trunk or the first horizontal trunk is different from an angle formed by the second branch portion with the first vertical trunk or the first horizontal trunk; wherein the second trunk electrode further comprises a second horizontal trunk extending in the second direction, the second branch electrode comprises a third branch portion and a fourth branch portion connected to the second vertical trunk and the second horizontal trunk; wherein an angle formed by the third branch portion with the second vertical trunk or the second horizontal trunk is different from an angle formed by the fourth branch portion with the second vertical trunk or the second horizontal trunk.

Optionally, in some embodiments of the present application, the first shielding line comprises a first main body portion and at least one first shielding portion, the first main body portion being disposed on a side of the pixel electrodes, an end of the first shielding portion being connected to the first main body portion, the other end of the first shielding portion extending to a location between the first pixel electrode and the second pixel electrode; wherein the first shielding portion comprises a plurality of first shielding sub-portions and a plurality of second shielding sub-portions being arranged alternately in the first direction, the first shielding sub-portion extending in the first direction, the second shielding sub-portion being connected to the first shielding sub-portion, the first shielding sub-portion being disposed on a side of the first vertical trunk away from the first branch electrode and/or on a side of the second vertical trunk away from the second branch electrode.

Optionally, in some embodiments of the present application, the second shielding line comprises a second main body portion and at least one second shielding portion, the second main body portion being disposed on a side of the pixel electrodes away from the first main body portion, an end of the second shielding portion being connected to the second main body portion, the other end of the second shielding portion extending to a location between the first pixel electrode and the second pixel electrode; wherein the second shielding portion comprises a plurality of third shielding sub-portions and a plurality of fourth shielding sub-portions being arranged alternately in the first direction, the third shielding sub-portion extending in the first direction, the fourth shielding sub-portion being connected to the third shielding sub-portion, the third shielding sub-portion being disposed on a side of the first branch electrode away from the first vertical trunk and/or on a side of the second branch electrode away from the second vertical trunk.

Optionally, in some embodiments of the present application, the array substrate further comprises a plurality of first metal layers, the first metal layers being disposed on the base substrate, the other end of the first shielding portion and the other end of the second shielding portion being connected to the corresponding first metal layers respectively.

Optionally, in some embodiments of the present application, the array substrate further comprises: a plurality of data lines disposed on the base substrate, a plurality of the data lines extending in the first direction; a plurality of scanning lines disposed on the base substrate, a plurality of the scanning lines extending in the second direction, the data lines and scanning lines intersect to define a plurality of sub-pixel units, the sub-pixel unit comprises one of the first pixel electrodes or one of the second pixel electrodes.

Optionally, in some embodiments of the present application, the first shielding sub-portion and the third shielding sub-portion overlap with the data lines, and the second shielding sub-portion and the fourth shielding sub-portion overlap with the scanning lines.

Optionally, in some embodiments of the present application, the pixel electrodes and the first shielding line and the second shielding line are disposed on the same layer.

The embodiments of the present application provide an array substrate and display panel, wherein the array substrate includes a base substrate, a plurality of pixel electrodes, a first shielding line, and a second shielding line. The plurality of the pixel electrodes are disposed on the base substrate, and the plurality of the pixel electrodes include a plurality of first pixel electrodes arranged in a first direction and a second direction. The first pixel electrode includes a first trunk electrode and a first branch electrode, the first trunk electrode includes a first vertical trunk extending in the first direction. The first direction and the second direction intersect. The first shielding line is disposed on the base substrate, and the first shielding line includes a portion disposed on the periphery of the first vertical trunk. The second shielding line is disposed on the base substrate, and the second shielding line includes a portion disposed on the periphery of the first branch electrode. The first shielding line and the second shielding line are electrically insulated. In the present application, since the first shielding line is disposed on the periphery of the first vertical trunk and the second shielding line is disposed on the periphery of the first branch electrode, and the first shielding line and the second shielding line are electrically insulated, when the array substrate provided in the present application is used to form a liquid crystal display panel, the first shielding line and the second shielding line are provided with different potential electrical signals during the liquid crystal alignment process, that is, the voltage of the first shielding line is greater than the voltage of the pixel electrodes, and the voltage of the second shielding line is less than the voltage of the pixel electrodes, thereby forming a voltage difference between the pixel electrode and the first shielding line, and a voltage difference between the pixel electrode and the second shielding line, and further driving the liquid crystal molecules in the region corresponding to the first vertical trunk and the first shielding line and the liquid crystal molecules in the region corresponding to the first branch electrode and the second shielding line to shift, and improving the problem of dark lines on the periphery of the pixel electrodes and increasing the light transmittance of the liquid crystal display panel.

DETAILED DESCRIPTION OF THE EMBODIMENTS

Figure 1:
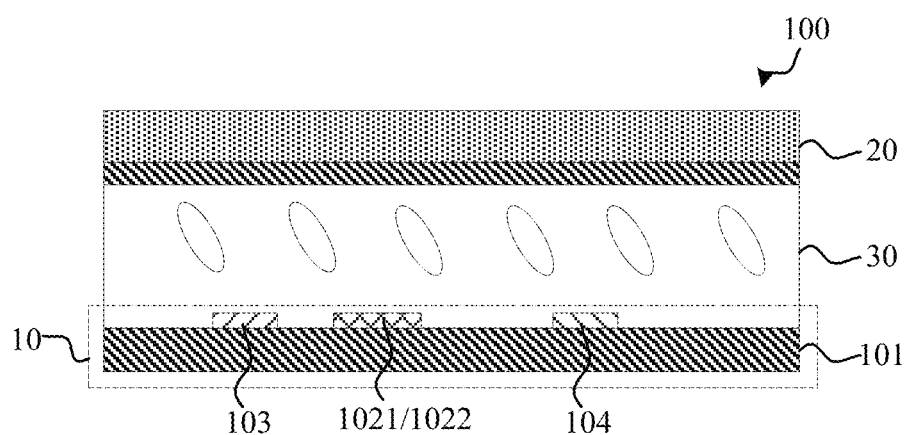
FIG. 1 is a structural schematic diagram of a display panel provided in the embodiments of the present application.

Hereinafter, the present application will be described with reference to the accompanying drawings. Note that the present application can be implemented in various different ways, and it is easily understood by those skilled in the art that modes and details can be variously changed without departing from the spirit and the scope of the present application. Therefore, the present application should not be construed as being limited to the following description of the embodiment modes.

The embodiments of the present application provide an array substrate and a display panel. Detailed explanations will be provided separately below. It should be noted that the description order of the following embodiments does not limit the preferred order of the embodiments.

The embodiments of the present application provide an array substrate, the array substrate includes a base substrate, a plurality of pixel electrodes, a first shielding line, and a second shielding line. The plurality of the pixel electrodes are disposed on the base substrate and include a plurality of first pixel electrodes. A plurality of the first pixel electrodes are arranged in a first direction and a second direction. The first pixel electrode includes a first trunk electrode and a first branch electrode. The first trunk electrode includes a first vertical trunk extending in the first direction. The first direction and second direction intersect. The first shielding line is disposed on the base substrate, the first shielding line includes a portion disposed on the periphery of the first vertical trunk. The second shielding line is disposed on the base substrate, and the second shielding line includes a portion disposed on the periphery of the first branch electrode. The first shielding line and the second shielding line are electrically insulated. In the present application, since the first shielding line is disposed on the periphery of the first vertical trunk and the second shielding line is disposed on the periphery of the first branch electrode, and the first shielding line and the second shielding line are electrically insulated, when the array substrate provided in the present application is used to form a liquid crystal display panel, different potential electrical signals are provided to the first shielding line and second shielding line during the liquid crystal alignment process. The voltage of the first shielding line is greater than the voltage of the pixel electrode, and the voltage of the second shielding line is less than the voltage of the pixel electrode, thereby forming a voltage difference between the pixel electrode and the first shielding line and a voltage difference between the pixel electrode and the second shielding line, and further driving the liquid crystal molecules in the regions corresponding to the first vertical trunk and the first shielding line and the liquid crystal molecules in the regions corresponding to the first branch electrode and the second shielding line to shift, and improving the problem of dark lines on the periphery of the pixel electrodes and increasing the light transmittance of the liquid crystal display panel.

Refer to FIG. 1, FIG. 1 is a structural schematic diagram of a display panel provided in the embodiments of the present application. The embodiments of present application provide a display panel 100. The display panel 100 includes an array substrate 10 and an opposing substrate 20 arranged opposite each other, and a liquid crystal layer 30 disposed between the array substrate 10 and the opposing substrate 20.

In the embodiments of the present application, the array substrate 10 can be a COA (Color-filter On Array) type array substrate, that is, the color filters are disposed on the array substrate 10 and the opposing substrate 20 is provided without color filters. The opposing substrate 20 can also be a color filter substrate, and the array substrate 10 is provided without color filters.

It should be noted that, the display panel 100 provided in the present application can be a vertical electric field type liquid crystal display panel, such as a twisted nematic (TN) type liquid crystal display panel, a multi-domain vertical alignment (MVA) type liquid crystal display panel, or a horizontal electric field type liquid crystal display panel, such as a fringe field switching (FFS) type liquid crystal display panel, an in-plane switching (IPS) type liquid crystal display panel. The present application takes a vertically aligned liquid crystal display panel as an example for illustration but is not limited thereto.

The following will provide a detailed explanation of the array substrate 10 provided in the present application through specific embodiments.

Figure 2:
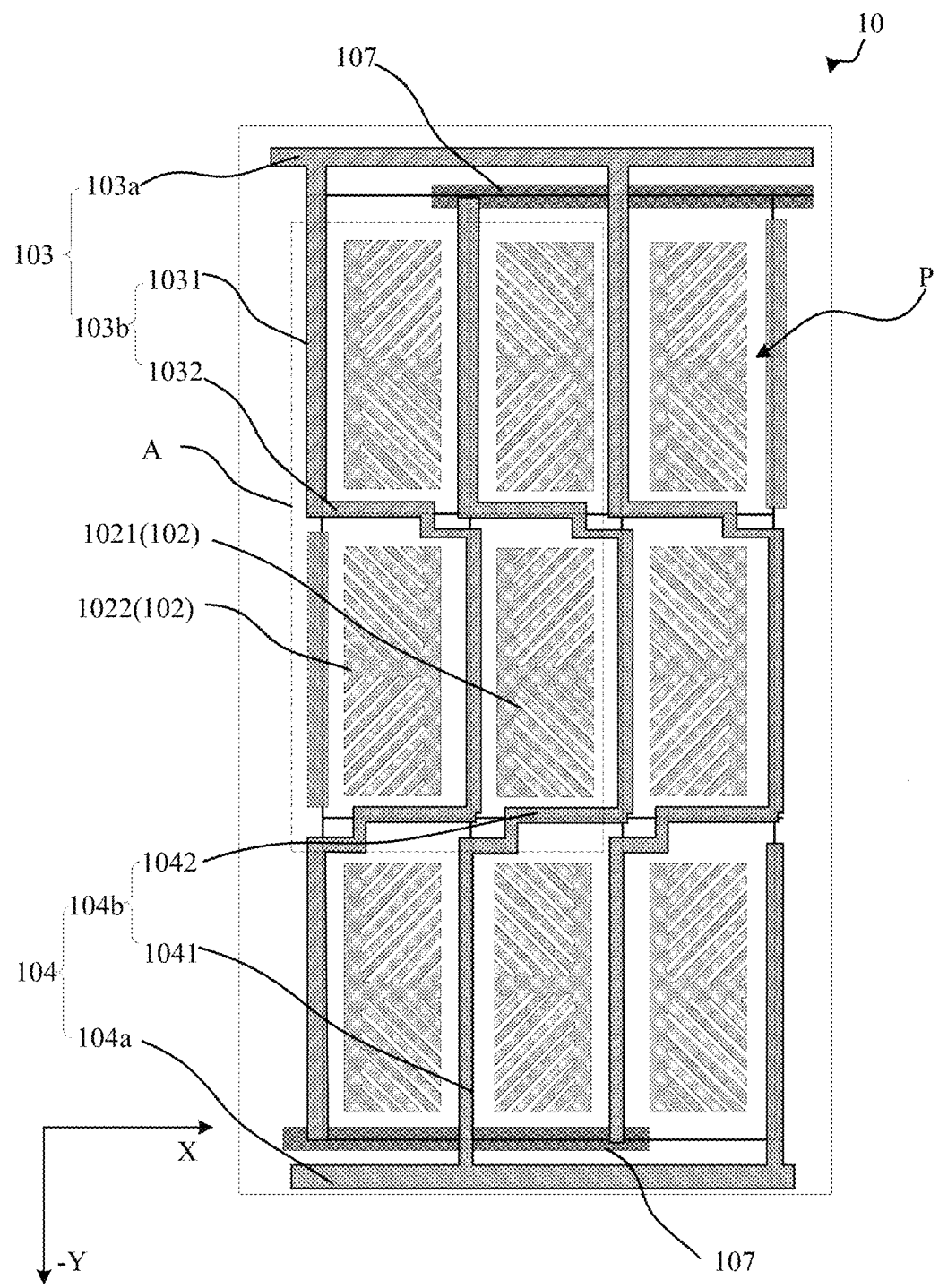
FIG. 2 is a planar schematic diagram of an array substrate provided in the embodiments of the present application.
Figure 3:
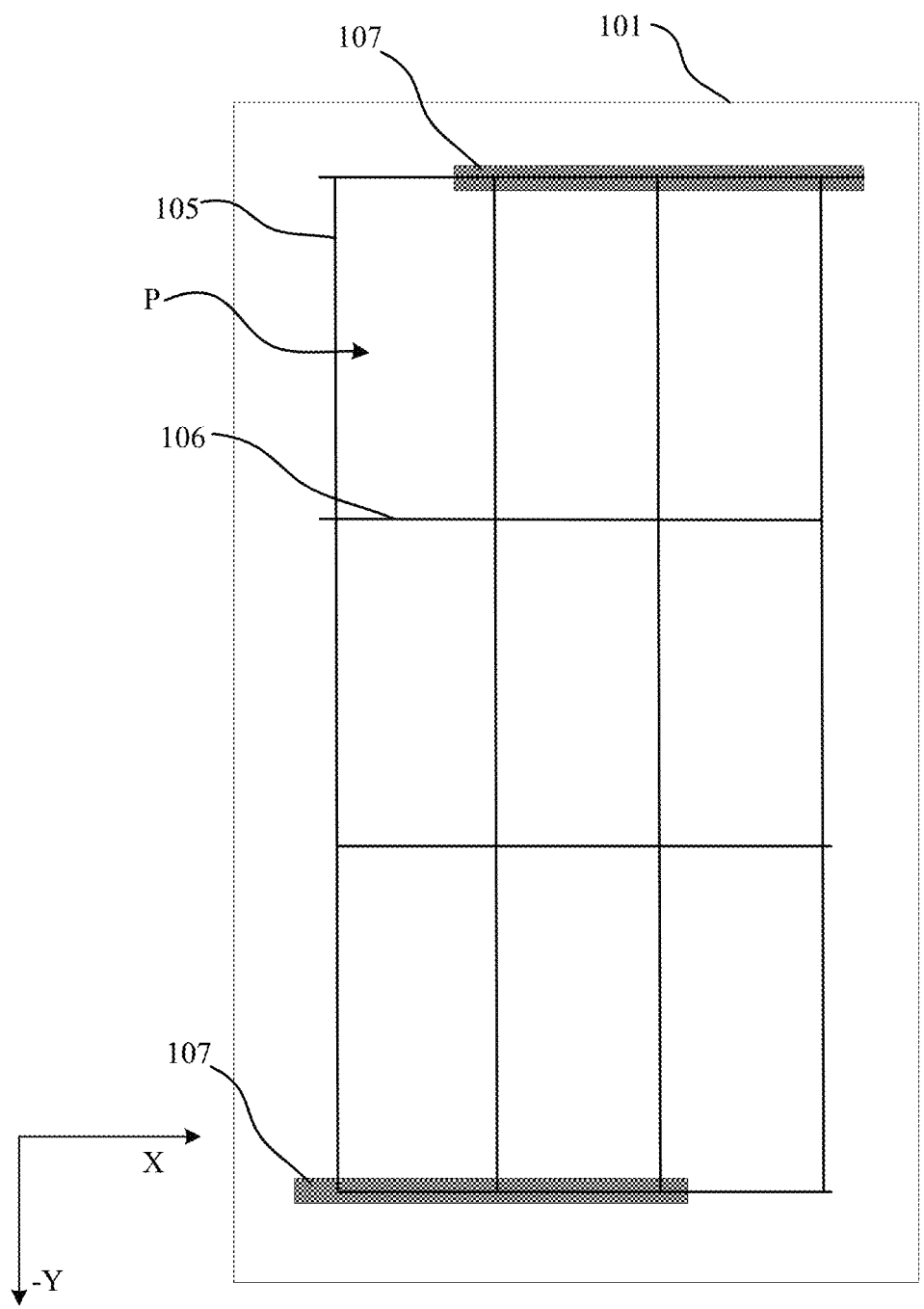
FIG. 3 is a planar schematic diagram of a part of components of an array substrate provided in the embodiments of the present application.
Figure 4:
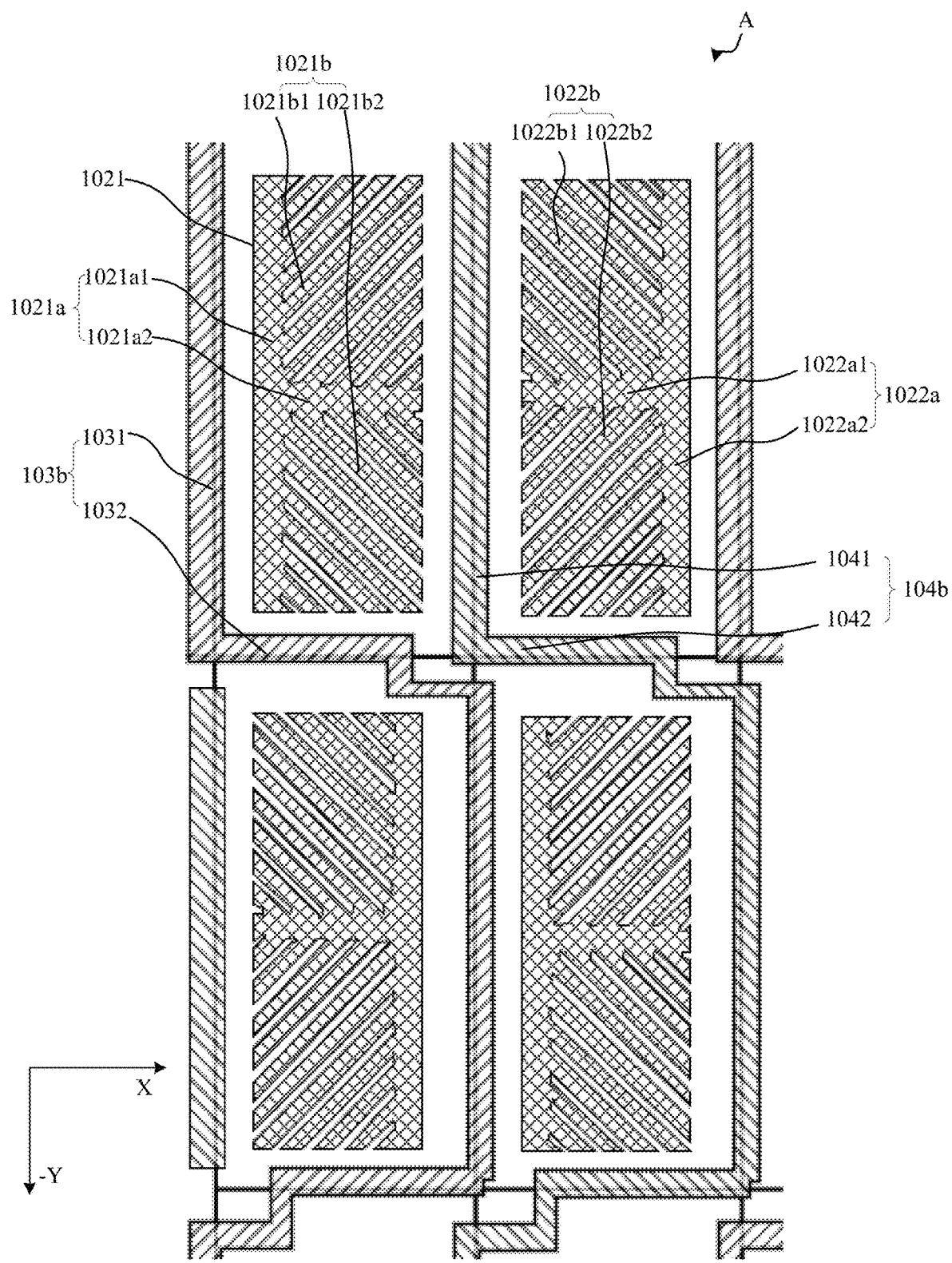
FIG. 4 is an enlarged view of area A in FIG. 2.

Refer to FIGS. 2, 3, and 4. FIG. 2 is a planar schematic diagram of an array substrate provided in the embodiments of the present application, FIG. 3 is a planar schematic diagram of a part of components of an array substrate provided in the embodiments of the present application, FIG. 4 is an enlarged view of area A in FIG. 2. In the embodiments of the present application, the array substrate 10 includes a base substrate 101, a plurality of data lines 105, a plurality of scan lines 106, a plurality of first metal layers 107, a plurality of pixel electrodes 102, a first shielding line 103, and a second shielding line 104.

A plurality of the data lines 105 are disposed on the base substrate 101 and extend in a first direction. A plurality of the scan lines 106 are disposed on the base substrate 101 and extend in a second direction. The data lines 105 and the scan lines 106 intersect to define a plurality of sub-pixel units P. The first direction and the second direction intersect.

In the embodiments of the present application, the first direction is the direction extending in the −Y axis, and the second direction is the direction extending in the X axis. Optionally, the first direction and the second direction perpendicularly intersect, specifically depending on the specification of the array substrate 10. Of course, in some embodiments, the second direction can be the direction extending in the −Y axis, and the first direction can be the direction extending in the X axis. It should be noted that the embodiments of the present application are illustrated with the first direction extending in the Y axis and the second direction extending in the X axis as examples, but this should not be understood as limiting the present application.

The pixel electrode 102 is disposed on the base substrate 101, and the pixel electrode 102 is disposed in the same layer as the first shielding line 103 and the second shielding line 104. A plurality of the pixel electrode 102 include a plurality of first pixel electrodes 1021, and a plurality of the first pixel electrodes 1021 are arranged in the first direction and the second direction.

The first pixel electrode 1021 includes a first trunk electrode 1021a and a first branch electrode 1021b. The first trunk electrode 1021a includes a first vertical trunk 1021a1 extending in the first direction and a first horizontal trunk 1021a2 extending in the second direction. The first branch electrode 1021b includes a first branch portion 1021b1 and a second branch portion 1021b2 connected to the first vertical trunk 1021a1 and the first horizontal trunk 1021a2, that is, the first branch electrode 1021b includes a plurality of first branch portions 1021b1 extending in a third direction and arranged at equal intervals in a fourth direction and a plurality of second branch portions 1021b2 extending in the fourth direction and arranged at equal intervals in the third direction. Preferably, the angle between the third direction and the first direction is 45°, and the fourth direction is perpendicular to the third direction. The first branch portion 1021b1 and the second branch portion 1021b2 are disposed on opposite sides of the first horizontal trunk 1021a2. The angle formed by the first branch portion 1021b1 with the first vertical trunk 1021a1 or the first horizontal trunk 1021a2 is different from the angle formed by the second branch portion 1021b2 with the first vertical trunk 1021a1 or the first horizontal trunk 1021a2. It can be understood that the first branch portion 1021b1 and the second branch portion 1021b2 are arranged in two different directions, and therefore, the first pixel electrode 1021 forms two domains. In the embodiments of the present application, the array substrate 10 adopts a 2-domain pixel design, which increases the aperture ratio of the display panel 100. In the present application, one sub-pixel unit P includes one first pixel electrode 1021.

In embodiments of the present application, a plurality of the pixel electrode 102 further include a plurality of second pixel electrodes 1022. A plurality of the first pixel electrodes 1021 and a plurality of the second pixel electrodes 1022 are alternately arranged in the first direction and the second direction. The second pixel electrode 1022 includes a second trunk electrode 1022a and a second branch electrode 1022b. The second trunk electrode 1022a includes a second vertical trunk 1022a1 extending in the first direction and a second horizontal trunk 1022a2 extending in the second direction. The second branch electrode 1022b includes a third branch portion 1022b1 and a fourth branch portion 1022b2 connected to the second vertical trunk 1022a1 and the second horizontal trunk 1022a2. That is, the second branch electrode 1022b includes a plurality of the third branch portions 1022b1 extending in the third direction and arranged at equal intervals in the fourth direction, and a plurality of the fourth branch portions 1022b2 extending in the fourth direction and arranged at equal intervals in the third direction. The third branch portion 1022b1 and the fourth branch portion 1022b2 are arranged on opposite sides of the second horizontal trunk 1022a2 respectively. The angle formed by the third branch portion 1022b1 with the second vertical trunk 1022a1 or the second horizontal trunk 1022a2 is different from the angle formed by the fourth branch portion 1022b2 with the second vertical trunk 1022a1 or the second horizontal trunk 1022a2. It can be understood that the third branch portion 1022b1 and the fourth branch portion 1022b2 are arranged in two different directions, and therefore, the second pixel electrode 1022 forms two domains. In the embodiments of the present application, the array substrate 10 adopts a 2-domain pixel design, which increases the aperture ratio of the display panel 100. In the present application, a sub-pixel unit P includes either a first pixel electrode 1021 or a second pixel electrode 1022.

In some embodiments, in the first direction, adjacent first pixel electrodes 1021 and second pixel electrodes 1022 are arranged in a center-symmetric configuration. In the second direction, adjacent first pixel electrodes 1021 and second pixel electrodes 1022 are arranged in an axis-symmetric configuration. Since the first pixel electrodes 1021 and the second pixel electrodes 1022 are arranged in a center-symmetric configuration in the first direction and the first pixel electrodes 1021 and the second pixel electrodes 1022 are arranged in a axis-symmetric configuration in the second direction, t The angle formed by the first branch portion 1021b1 and the first vertical trunk 1021a1 or the first horizontal trunk 1021a2, the angle formed by the second branch portion 1021b2 and the first vertical trunk 1021a1 or the first horizontal trunk 1021a2, the angle formed by the third branch portion 1022b1 and the second vertical trunk 1022a1 or the second horizontal trunk 1022a2, and the angle formed by the fourth branch portion 1022b2 and the second vertical trunk 1022a1 or the second horizontal trunk 1022a2 are not the same. In the embodiments of the present application, at least two liquid crystal molecules with different shifting states are disposed in each subpixel region of the pixel, that is, liquid crystal molecules with different pre-tilt angles are disposed in one sub-pixel region to further improve the viewing angle of the display panel.

It should be understood that, in the present application embodiment, the first pixel electrode 1021 includes a sealing side on one side of the first vertical trunk, and an opening side on the opposite side of the sealing side of the first pixel electrode 1021. Similarly, the second pixel electrode 1022 includes a sealing side on one side of the second vertical trunk, and an opening side on the opposite side of the sealing side of the second pixel electrode 1022.

The first shielding line 103 is arranged on the base substrate 101, and the first shielding line 103 includes a portion disposed on the periphery of the first vertical trunk 1021a1 and the second vertical trunk 1022a1.

The second shielding line 104 is arranged on the base substrate 101, and the second shielding line 104 includes a portion disposed on the periphery of the first branch electrode 1021b and the second branch electrode 1022b. The first shielding line 103 and the second shielding line 104 are electrically insulated. When the array substrate 10 provided in the present application is used for a liquid crystal display panel, during the liquid crystal alignment process, the first shielding line 103 and the second shielding line 104 are provided with signals of different potential. In liquid crystal alignment process, the voltage of the pixel electrode 102 is Vp, the voltage of the first shielding line 103 is Vd1, and the voltage of the second shielding line 104 is Vd2, where Vd1>Vp and Vd2<Vp.

In some embodiments, Vd1=1.2~1.8 Vp and Vd2=0.4~0.8 Vp. For example, the voltage Vd1 of the first shielding line 103 can be any of 1.2 Vp, 1.3 Vp, 1.4 Vp, 1.5 Vp, 1.6 Vp, 1.7 Vp, or 1.8 Vp. The voltage Vd2 of the first shielding line 103 can be any of 0.4 Vp, 0.5 Vp, 0.6 Vp, 0.7 Vp, or 0.8 Vp. The inventors of the present application found that, during the liquid crystal alignment process, when the voltage range of Vd1 for the first shielding line 103 is 1.2 Vp to 1.8 Vp, and the voltage range of Vd2 for the second shielding line 104 is 0.4 Vp to 0.8 Vp, the first shielding line 103 forms a pressure difference with the first vertical trunk 1021a1 and the second vertical trunk 1022a1, and the second shielding line 104 forms a pressure difference with the first branch electrode 1021b and the second branch electrode 1022b, such that the liquid crystal molecules in the corresponding regions between the first vertical trunk 1021a1 and the first shielding line 103, the liquid crystal molecules in the corresponding regions between the second vertical trunk 1022a1 and the first shielding line 103, the liquid crystal molecules in the corresponding regions between the first branch electrode 1021b and the second shielding line 104, and the liquid crystal molecules in the corresponding regions between the second branch electrode 1022b and the second shielding line 104 are affected by the electric field and tilt in the same direction. Thereby improving the problem of dark lines on the periphery of the pixel electrode 102 and increases the light transmittance of the liquid crystal display panel.

In the present application, by providing a first shielding line 103 along the periphery of the first vertical trunk 1021a1 and the second vertical trunk 1022a1, and a second shielding line 104 along the periphery of the first branch electrode 1021b and the second branch electrode 1022b, during the liquid crystal alignment process of the liquid crystal display panel, the voltage of the first shielding line 103 is greater than the voltage of the pixel electrode 102, and the voltage of the second shielding line 104 is less than the voltage of the pixel electrode 102. This creates a voltage difference between the pixel electrode 102 and the first shielding line 103, as well as between the pixel electrode 102 and the second shielding line 104, allowing the liquid crystal molecules in the area corresponding to the first vertical trunk 1021a1 and the first shielding line 103, the liquid crystal molecules in the area corresponding to the first vertical trunk 1021a1 and the first shielding line 103, the liquid crystal molecules in the area corresponding to the first branch electrode 1021b and the second shielding line 104, and the liquid crystal molecules in the area corresponding to the second branch electrode 1022b and the second shielding line 104 to shift. Thereby improving the problem of dark lines on the periphery of the pixel electrode 102 and increasing the light transmittance of the liquid crystal display panel.

More specifically, the first shielding line 103 includes a first main body portion 103a and at least one first shielding portion 103b. The first main body portion 103a is disposed on one side of the pixel electrode 102. One end of the first shielding portion 103b is connected to the first main body portion 103a, and the other end of the first shielding portion 103b extends to a space between the first pixel electrode 1021 and the second pixel electrode 1022. A first shielding portion 103b includes a plurality of first shielding sub-portions 1031 and second shielding sub-portions 1032 alternately arranged in the first direction. The first shielding sub-portion 1031 extends in the first direction. The second shielding sub-portion 1032 extends in the second direction. The first shielding sub-portion 1031 is disposed on the side of the first vertical trunk 1021a1 away from the first branch electrode 1021b and/or on the side of the second vertical trunk 1022a1 away from the second branch electrode 1022b. In the present application, a first shielding portion 103b is formed by connecting a plurality of first shielding sub-portions 1031 and a plurality of second shielding sub-portions 1032 that are arranged alternately, such that the first shielding portion 103b is alternately disposed between two columns of sub-pixel units P, and such that the first shielding portion 103b can simultaneously form a voltage difference with the pixel electrodes 102 in the two columns of sub-pixel units P respectively, which simplifies the wiring arrangement of the array substrate 10 and further increases the aperture ratio of the display panel 100.

The second shielding line 104 includes a second main body portion 104a and at least one second shielding portion 104b, with the second main body portion 104a being disposed on the side of the pixel electrode 102 away from the first main body portion 103a. One end of the second shielding portion 104b is connected to the second main body portion 104a, and the other end of the second shielding portion 104b extends to a space between the first pixel electrode 1021 and the second pixel electrode 1022. The second shielding portion 104b includes a plurality of third shielding sub-portions 1041 and a plurality of fourth shielding sub-portions 1042 alternately arranged in the first direction. The third shielding sub-portion 1041 extends in the first direction. The fourth shielding sub-portion 1042 extends in the second direction. The third shielding sub-portion 1041 is disposed on the side of the first branch electrode 1021b away from the first vertical trunk 1021a1 and/or on the side of the second branch electrode 1022b away from the second vertical trunk 1022a1. In the present application, a second shielding portion 104b is formed by connecting a plurality of third shielding sub-portions 1041 and a plurality of fourth shielding sub-portions 1042 that are arranged alternately, such that the second shielding portion 104b is alternately disposed between two columns of sub-pixel units P, and such that the second shielding portion 104b can simultaneously form a voltage difference with the pixel electrode 102 in the two columns of sub-pixel units P respectively, which simplifies the wiring arrangement of the array substrate 10 and further increases the aperture ratio of the display panel 100.

In some embodiments, the first shielding line 103, the second shielding line 104, and the pixel electrode 102 are arranged in the same layer. Due to the arrangement of the first shielding line 103, the second shielding line 104, and the pixel electrode 102 in the same layer, the fabrication process of the array substrate 10 is simplified, reducing the cost of the array substrate 10.

A plurality of first metal layers 107 are disposed on the base substrate 101. The other end of the first shielding portion 103b and the other end of the second shielding portion 104b are connected to the corresponding first metal layers 107, respectively. It should be understood that the number of first metal layers 107 is at least two, with one first metal layer 107 connected to the other end of the first shielding portion 103b, and another first metal layer 107 connected to the other end of the second shielding portion 104b. In the present application, the one end of the first shielding portion 103b and the one end of the second shielding portion 104b are connected to the corresponding first metal layers 107 respectively, thereby improving the signal stability of the first shielding line 103 and the second shielding line 104.

In some embodiments, the first metal layer 107 and the scanning line 106 are arranged in the same layer, thereby simplifying the fabrication process of the array substrate 10.

Figure 5:
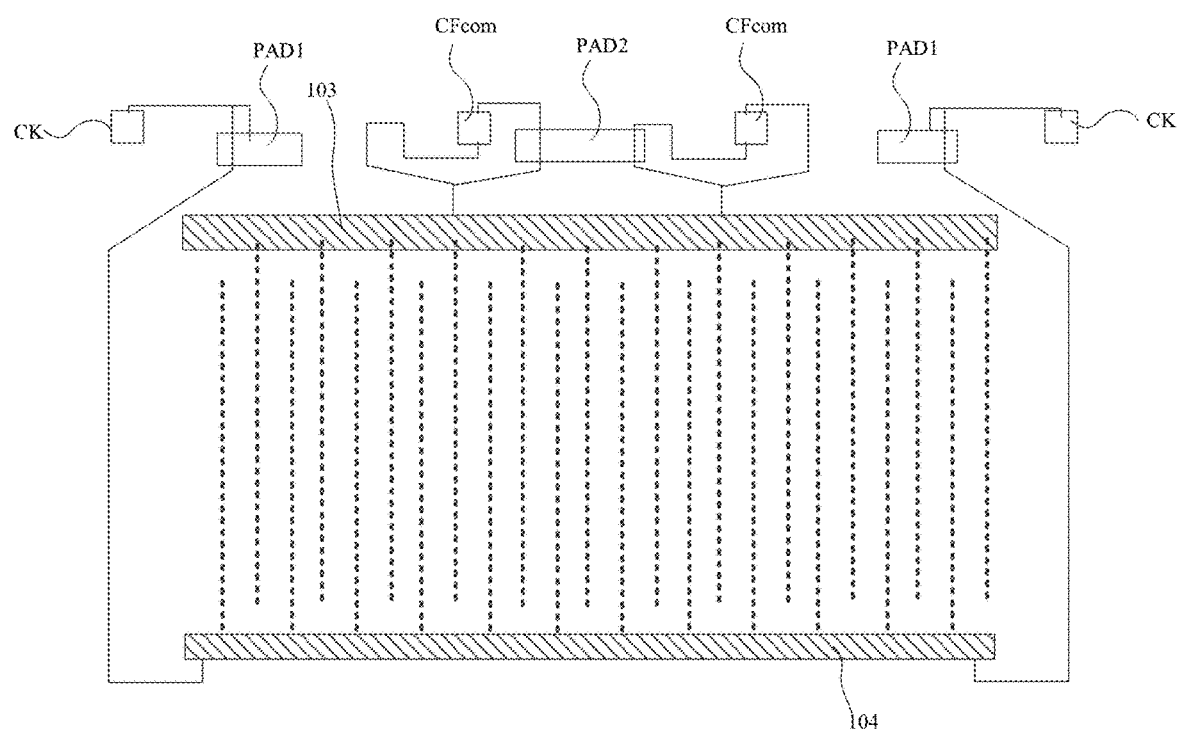
FIG. 5 is a schematic diagram of an array substrate provided in the embodiments of the present application.

As shown in FIG. 5, FIG. 5 is a schematic diagram of an array substrate provided in the embodiments of the present application. The first shielding line 103 receives a high level signal through a bonding lead. The bonding lead is electrically connected to the second pad PAD2 on the array substrate 10 through a connection line. The second pad PAD2 is used to electrically connect the common electrode of the second substrate 20. The second shielding line 104 receives a low level signal through another bonding lead. The bonding lead is electrically connected to the first pad PAD1 on the array substrate 10 through another connection line. The first pad PAD1 is electrically connected to the clock signal line CK. The first shielding line 103 is electrically connected to the first metal layer and forms a mesh. The second shielding line 104 is electrically connected to the first metal layer and forms a mesh. After the alignment is completed, the connection lines are cut off by the laser process. Afterward, the first shielding line 103 and the second shielding line 104 are provided with a same voltage through a chip-on-film electrically connected to the bonding leads, which does not affect the normal display of the array substrate.

In some embodiments, the first shielding sub-portion 1031 and the third shielding sub-portion 1041 overlap with the data line 105. The second shielding sub-portion 1032 and the fourth shielding sub-portion 1042 overlap with the scanning line 106. Generally, lateral electric fields will be generated between the pixel electrode 102 and the data line 105, between the pixel electrode 102 and the scan line 106, and between the pixel electrodes 102 of adjacent rows of pixels. Therefore, the present application provides the first shielding line 103 and the second shielding line 104 to shield the lateral electric fields generated between the pixel electrode 102 and the data line 105, between the pixel electrode 102 and the scan line 106, and between the adjacent first pixel electrode 1021 and second pixel electrode 1022, to prevent the lateral electric fields from affecting the pre-tilt angle of the liquid crystal molecules. Additionally, since the first shielding sub-portion 1031 and the third shielding sub-portion 1041 overlap with the data line 105, and the second shielding sub-portion 1032 and the fourth shielding sub-portion 1042 overlap with the scanning line 106, the aperture ratio of the display panel 100 is further improved.

Figure 6:
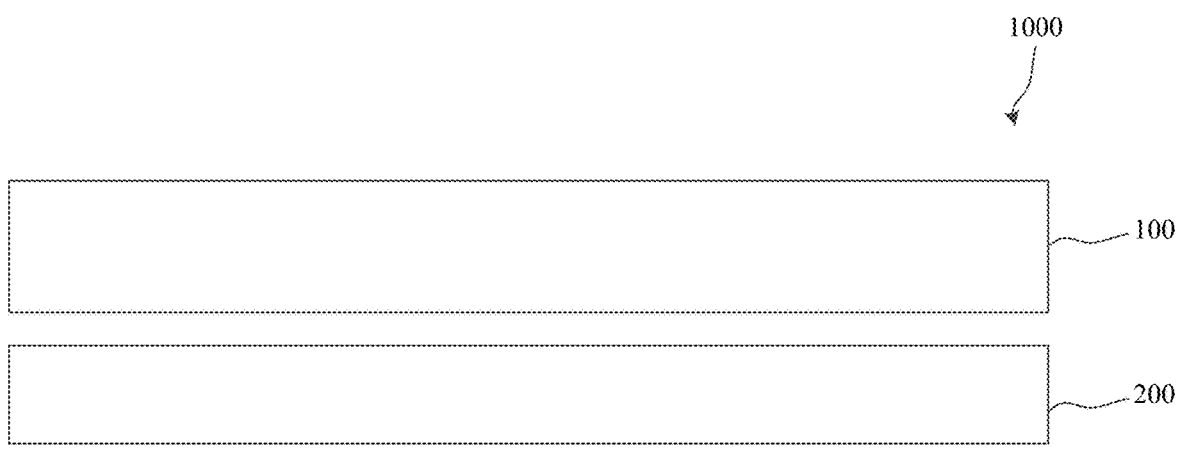
FIG. 6 is a schematic diagram of a display panel provided in the embodiments of the present application.

Accordingly, the embodiments of the present application also provide a display device. Refer to FIG. 6, FIG. 6 is a schematic diagram of a display panel provided in the embodiments of the present application. The display device includes a backlight module 200 and a display panel 100. The display panel 100 is disposed on the backlight module 200, and the backlight module 200 is configured to provide a backlight source for the display panel 100. The display panel 100 is the display panel 100 provided in any one of the aforementioned embodiments.

The display device provided in the embodiments of the present application can be used in at least one of the following: smartphones, tablet PCs, mobile phones, video telephones, e-book readers, desktop PCs, laptop PCs, netbook computers, workstations, servers, personal digital assistants, portable multimedia players, MP3 players, mobile medical devices, cameras, gaming devices, digital cameras, car navigation systems, electronic billboards, automated teller machines, or wearable devices.

In summary, although the present application has been disclosed in the form of preferred embodiments as described above, the aforementioned preferred embodiments are not intended to limit the present application. Those skilled in the art can make various modifications and refinements without departing from the spirit and scope of the present application. Therefore, the scope of protection of the present application is defined by the scope of the claims.

What is claimed is:

1. An array substrate comprising:
a base substrate;
a plurality of pixel electrodes disposed on the base substrate, the plurality of the pixel electrodes comprise a plurality of first pixel electrodes and a plurality of second pixel electrodes being arranged alternately in a first direction and a second direction, each of the first pixel electrodes comprises a first trunk electrode and a first branch electrode, the first trunk electrode comprises a first vertical trunk extending in the first direction, the first direction and the second direction intersect;
a first shielding line disposed on the base substrate, the first shielding line comprises a portion disposed on the periphery of the first vertical trunk; and
a second shielding line disposed on the base substrate, the second shielding line comprises a portion disposed on the periphery of the first branch electrode;
wherein the first shielding line and the second shielding line being electrically insulated;
wherein the first shielding line comprises at least one first shielding portion, an end of the first shielding portion extending to a location between the first pixel electrode and the second pixel electrode;
wherein the first shielding portion comprises a plurality of first shielding sub-portions and a plurality of second shielding sub-portions being arranged alternately in the first direction, each of the first shielding sub-portions extending in the first direction, each of the second shielding sub-portions extending in the second direction, the second shielding sub-portion being connected to the first shielding sub-portion;
wherein the second shielding line comprises at least one second shielding portion, an end of the second shielding portion extending to a location between the first pixel electrode and the second pixel electrode;

wherein the second shielding portion comprises a plurality of third shielding sub-portions and a plurality of fourth shielding sub-portions being arranged alternately in the first direction, each of the third shielding sub-portions extending in the first direction, each of the fourth shielding sub-portions extending in the second direction, the fourth shielding sub-portion being connected to the third shielding sub-portion.

2. The array substrate according to claim 1, wherein each of the second pixel electrodes comprises a second trunk electrode and a second branch electrode, the second trunk electrode comprises a second vertical trunk extending in the first direction, the first pixel electrode and the second pixel electrode adjacent to each other in the first direction being arranged in a center-symmetric configuration and the first pixel electrode and the second pixel electrode adjacent to each other in the second direction being arranged in an axis-symmetric configuration;

wherein the first shielding line comprises a portion disposed on the periphery of the second vertical trunk, and the second shielding line comprises a portion disposed on the periphery of the second branch electrode.

3. The array substrate according to claim 2, wherein the first trunk electrode further comprises a first horizontal trunk extending in the second direction, the first branch electrode comprises a first branch portion and a second branch portion connected to the first vertical trunk and the first horizontal trunk;

wherein an angle formed by the first branch portion with the first vertical trunk or the first horizontal trunk is different from an angle formed by the second branch portion with the first vertical trunk or the first horizontal trunk;

wherein the second trunk electrode further comprises a second horizontal trunk extending in the second direction, the second branch electrode comprises a third branch portion and a fourth branch portion connected to the second vertical trunk and the second horizontal trunk;

wherein an angle formed by the third branch portion with the second vertical trunk or the second horizontal trunk is different from an angle formed by the fourth branch portion with the second vertical trunk or the second horizontal trunk.

4. The array substrate according to claim 1, wherein the first shielding line comprises a first main body portion, the first main body portion being disposed on a side of the pixel electrodes, the other end of the first shielding portion being connected to the first main body portion;

the first shielding sub-portion being disposed on a side of the first vertical trunk away from the first branch electrode and/or on a side of the second vertical trunk away from the second branch electrode.

5. The array substrate according to claim 1, wherein the second shielding line comprises a second main body portion, the second main body portion being disposed on a side of the pixel electrodes away from the first main body portion, the other end of the second shielding portion being connected to the second main body portion;

the third shielding sub-portion being disposed on a side of the first branch electrode away from the first vertical trunk and/or on a side of the second branch electrode away from the second vertical trunk.

6. The array substrate according to claim 1, wherein the array substrate further comprises a plurality of first metal layers, the first metal layers being disposed on the base substrate, the other end of the first shielding portion and the other end of the second shielding portion being connected to the corresponding first metal layers respectively.

7. The array substrate according to claim 1, wherein the array substrate further comprises:

a plurality of data lines disposed on the base substrate, the plurality of data lines extending in the first direction; and a plurality of scanning lines disposed on the base substrate, the plurality of scanning lines extending in the second direction, the data lines and scanning lines intersect to define a plurality of sub-pixel units, the sub-pixel unit comprises one of the first pixel electrodes or one of the second pixel electrodes.

8. The array substrate according to claim 7, wherein the first shielding sub-portion and the third shielding sub-portion overlap with the data lines, and the second shielding sub-portion and the fourth shielding sub-portion overlap with the scanning lines.

9. The array substrate according to claim 1, wherein the pixel electrodes and the first shielding line and the second shielding line are disposed on the same layer.

10. The array substrate according to claim 1, wherein each of the second shielding sub-portions has, at one end, a step in the first direction, the third shielding sub-portion is positioned between adjacent pixel electrodes in the second direction, and the fourth shielding sub-portion is positioned between adjacent pixel electrodes in the first direction.

11. A display panel comprising:

an array substrate;

an opposing substrate; and a liquid crystal layer;

wherein the array substrate and the opposing substrate being disposed opposite to each other, the liquid crystal layer being disposed between the array substrate and the opposing substrate;

wherein the array substrate comprises:

a base substrate;

a plurality of pixel electrodes disposed on the base substrate, the plurality of the pixel electrodes comprise a plurality of first pixel electrodes and a plurality of second pixel electrodes being arranged alternately in a first direction and a second direction, each of the first pixel electrodes comprises a first trunk electrode and a first branch electrode, the first trunk electrode comprises a first vertical trunk extending in the first direction, the first direction and the second direction intersect;

a first shielding line disposed on the base substrate, the first shielding line comprises a portion disposed on the periphery of the first vertical trunk; and a second shielding line disposed on the base substrate, the second shielding line comprises a portion disposed on the periphery of the first branch electrode;

wherein the first shielding line and the second shielding line being electrically insulated;

wherein the first shielding line comprises at least one first shielding portion, an end of the first shielding portion extending to a location between the first pixel electrode and the second pixel electrode;

wherein the first shielding portion comprises a plurality of first shielding sub-portions and a plurality of second shielding sub-portions being arranged alternately in the first direction, each of the first shielding sub-portions extending in the first direction, each of the second shielding sub-portions extending in the second direction, the second shielding sub-portion being connected to the first shielding sub-portion;

wherein the second shielding line comprises at least one second shielding portion, an end of the second shielding portion extending to a location between the first pixel electrode and the second pixel electrode;

wherein the second shielding portion comprises a plurality of third shielding sub-portions and a plurality of fourth shielding sub-portions being arranged alternately in the first direction, each of the third shielding sub-portions extending in the first direction, each of the fourth shielding sub-portions extending in the second direction, the fourth shielding sub-portion being connected to the third shielding sub-portion.

12. The display panel according to claim 11, wherein each of the second pixel electrodes comprises a second trunk electrode and a second branch electrode, the second trunk electrode comprises a second vertical trunk extending in the first direction, the first pixel electrode and the second pixel electrode adjacent to each other in the first direction being arranged in a center-symmetric configuration and the first pixel electrode and the second pixel electrode adjacent to each other in the second direction being arranged in an axis-symmetric configuration;

wherein the first shielding line comprises a portion disposed on the periphery of the second vertical trunk, and the second shielding line comprises a portion disposed on the periphery of the second branch electrode.

13. The display panel according to claim 12, wherein the first trunk electrode further comprises a first horizontal trunk extending in the second direction, the first branch electrode comprises a first branch portion and a second branch portion connected to the first vertical trunk and the first horizontal trunk;

wherein an angle formed by the first branch portion with the first vertical trunk or the first horizontal trunk is different from an angle formed by the second branch portion with the first vertical trunk or the first horizontal trunk;

wherein the second trunk electrode further comprises a second horizontal trunk extending in the second direction, the second branch electrode comprises a third branch portion and a fourth branch portion connected to the second vertical trunk and the second horizontal trunk;

wherein an angle formed by the third branch portion with the second vertical trunk or the second horizontal trunk is different from an angle formed by the fourth branch portion with the second vertical trunk or the second horizontal trunk.

14. The display panel according to claim 10, wherein the first shielding line comprises a first main body portion, the first main body portion being disposed on a side of the pixel electrodes, the other end of the first shielding portion being connected to the first main body portion;

the first shielding sub-portion being disposed on a side of the first vertical trunk away from the first branch electrode and/or on a side of the second vertical trunk away from the second branch electrode.

15. The display panel according to claim 11, wherein the second shielding line comprises a second main body portion, the second main body portion being disposed on a side of the pixel electrodes away from the first main body portion, the other end of the second shielding portion being connected to the second main body portion;

the third shielding sub-portion being disposed on a side of the first branch electrode away from the first vertical trunk and/or on a side of the second branch electrode away from the second vertical trunk.

16. The display panel according to claim 11, wherein the array substrate further comprises a plurality of first metal layers, the first metal layers being disposed on the base substrate, the other end of the first shielding portion and the other end of the second shielding portion being connected to the corresponding first metal layers respectively.

17. The display panel according to claim 11, wherein the array substrate further comprises:

a plurality of data lines disposed on the base substrate, the plurality of data lines extending in the first direction; and a plurality of scanning lines disposed on the base substrate, the plurality of scanning lines extending in the second direction, the data lines and scanning lines intersect to define a plurality of sub-pixel units, the sub-pixel unit comprises one of the first pixel electrodes or one of the second pixel electrodes.

18. The display panel according to claim 17, wherein the first shielding sub-portion and the third shielding sub-portion overlap with the data lines, and the second shielding sub-portion and the fourth shielding sub-portion overlap with the scanning lines.

19. The display panel according to claim 10, wherein the pixel electrodes and the first shielding line and the second shielding line are disposed on the same layer.

20. The display panel according to claim 11, wherein each of the second shielding sub-portions has, at one end, a step in the first direction, the third shielding sub-portion is positioned between adjacent pixel electrodes in the second direction, and the fourth shielding sub-portion is positioned between adjacent pixel electrodes in the first direction.

\* \* \* \* \*